United States Patent [19]

Smith

[11] 4,116,208

[45] Sep. 26, 1978

[54] METHOD OF AND APPARATUS FOR PRESSURE BUFFERING ALL LEAK PATHS OF A LINED PLUG VALVE

[75] Inventor: Russell G. Smith, Cincinnati, Ohio
[73] Assignee: Xomox Corporation, Cincinnati, Ohio
[21] Appl. No.: 757,355
[22] Filed: Jan. 6, 1977
[51] Int. Cl.² ............................................. F16K 5/16
[52] U.S. Cl. ............................. 137/1; 137/246.22; 251/214
[58] Field of Search ............... 251/214, 309; 137/246, 137/246.11, 246.22, 246.12, 246.13, 240

[56] References Cited

U.S. PATENT DOCUMENTS

| | | | |
|---|---|---|---|
| 3,052,317 | 9/1962 | Leach | 137/246.13 |
| 3,426,581 | 2/1969 | Briggs | 137/246.13 |
| 3,521,856 | 7/1970 | Smith | 251/172 |
| 3,930,635 | 1/1976 | Smith | 251/214 |

FOREIGN PATENT DOCUMENTS

| | | | |
|---|---|---|---|
| 392,649 | 5/1933 | United Kingdom | 137/246.13 |
| 857,352 | 12/1960 | United Kingdom | 137/246.22 |

Primary Examiner—Martin P. Schwadron
Assistant Examiner—A. Michael Chambers
Attorney, Agent, or Firm—J. Warren Kinney, Jr.

[57] ABSTRACT

External and internal leakage of line media from a plug valve is prevented by the continuous application of a buffering media at all potential leak paths at pressure greater than the pressure of the line media.

17 Claims, 6 Drawing Figures

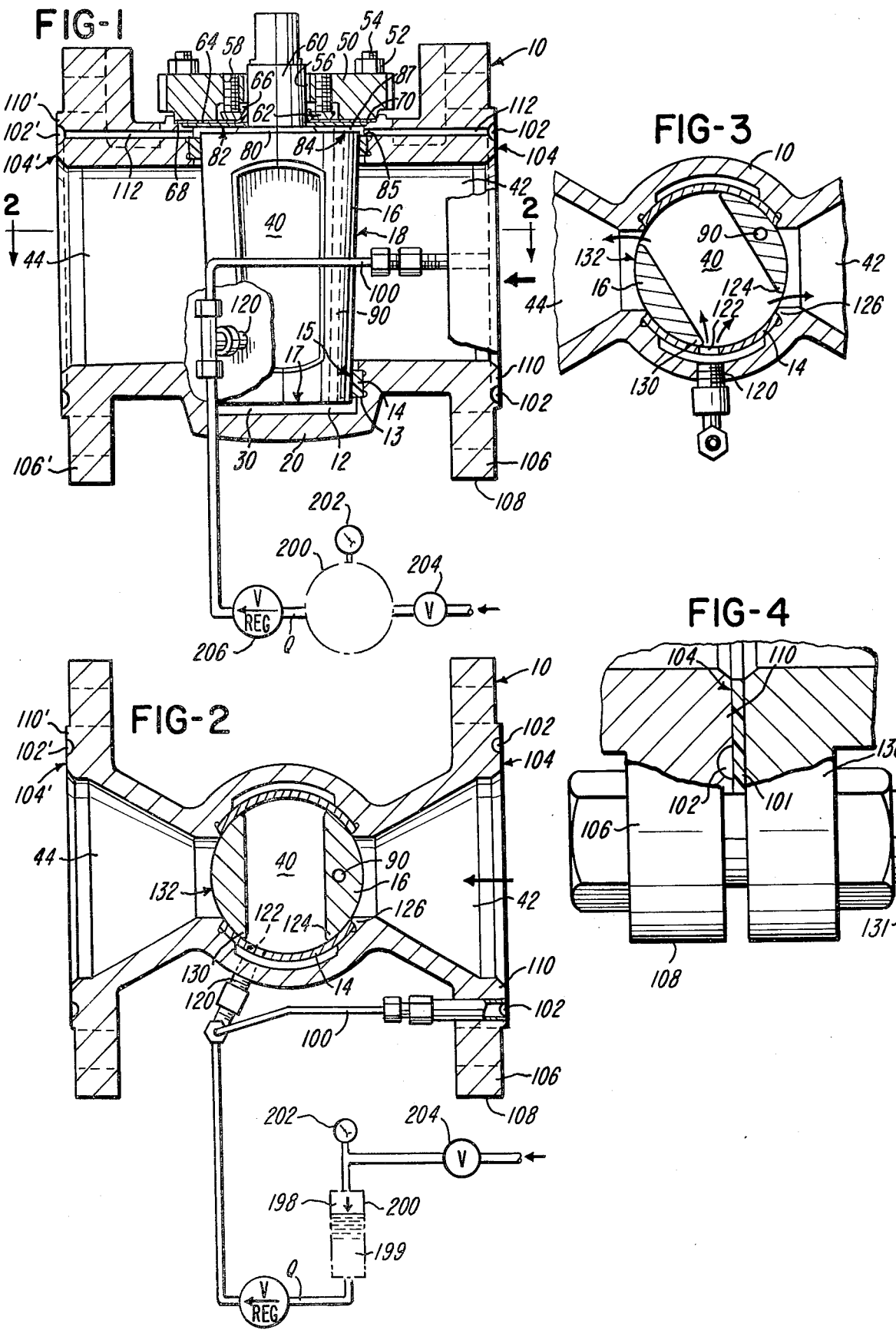

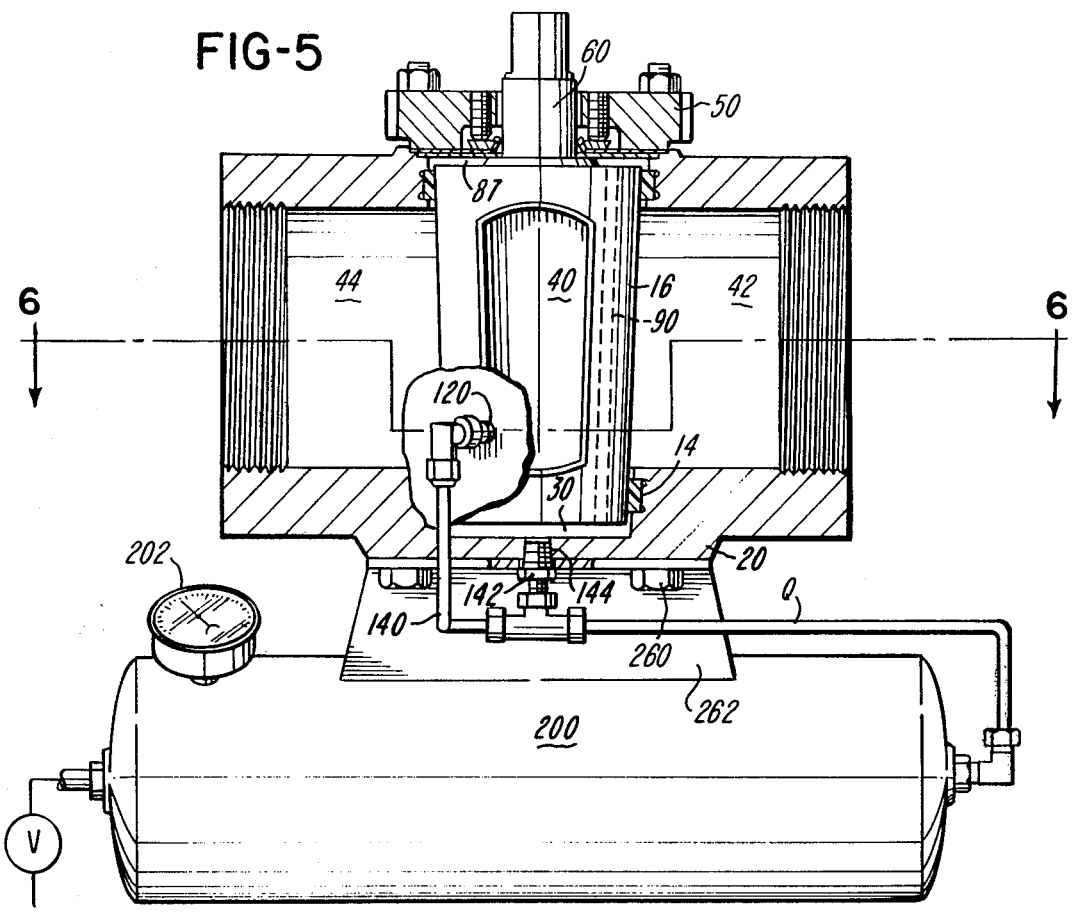
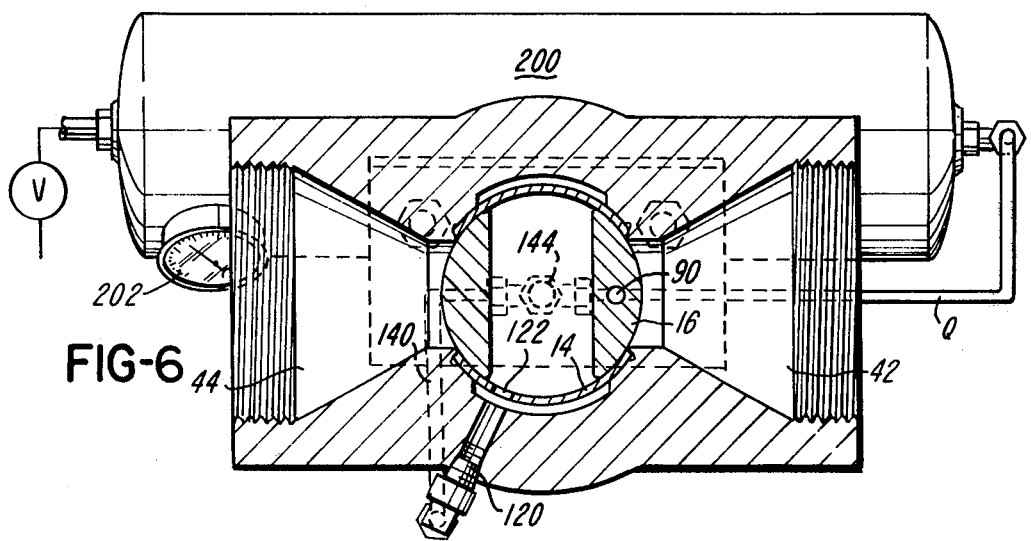

METHOD OF AND APPARATUS FOR PRESSURE BUFFERING ALL LEAK PATHS OF A LINED PLUG VALVE

BACKGROUND OF THE INVENTION

1. Field of the Invention

The field of the invention relates to plug valves, and in particular to lined plug valves of the type wherein a liner of Teflon or the like is interposed between the adjacent surfaces of the plug and plug receptive bore of the valve body.

2. Description of the Prior Art

This invention comprises a modification of the leakproof, rotary, plug-type fluid control valve of my U.S. Pat. No. 3,930,635*, assigned to the assignee of this application, which was an improvement on my U.S. Pat. No. 3,521,856*, also assigned to the assignee of this invention.

*A copy of this patent is submitted with this application.

The valve of this invention differs from the valve of U.S. Pat. No. 3,930,635 in that a buffering media is maintained, under continuous pressure which exceeds the pressure of the line media being controlled at all potential leak paths of the line media including the plug cavity when the valve is closed. The buffering media is also, in certain instances, utilized to automatically purge the plug cavity of the line media and then fill it with buffering media each time the valve is closed.

In my U.S. Pat. Nos. 3,930,635 and 3,521,856 the sealant was a heavy, viscid grease, a silicone grease, or caulk-like compound characterized by high viscosity and great resistance to dilution by the fluid line media being controlled by the valve. The sealant was not adapted to be introduced into the plug cavity, nor used as a purging agent when the valves were closed.

SUMMARY OF THE INVENTION

An inert buffering media of fluid or gas is continuously applied to or at all of the potential leak paths of the line media, including the flanged ends of flange-ended lined plug valves at a pressure which is greater than the pressure of the line media being controlled by the valve, for thereby providing a zero internal and/or external line media linkage lined plug valve, wherein any and all leakage will occur in the buffered media and be manifest by a drop in the pressure of the buffering media.

The upper and lower ends of the plug or valving member are in open communication with corresponding, interconnected, upper and lower chambers which contain a buffering media, under continuous pressure.

Buffering media under pressure is also automatically introduced into the plug cavity each time the valve is closed.

In those instances in which it is desired to "purge" the plug cavity of the line media, means are provided for automatically introducing buffering media into the plug cavity each time the valving member is moved to a "closed" position. When the "purging" feature is utilized the plug cavity will be completely filled with buffering media each time the valving member is closed.

A further feature of the invention is the provision of means in the raised face of the outer surface of the flanges of the valve body, into which buffering media, under pressure, is continuously applied whereby any leakage which occurs at the flanges will occur in the buffering media, rather than in the line media.

The source of buffering media, under pressure, may comprise a self-contained pressure reservoir of such a size and capacity as to effectively and positively preclude the internal and/or external leakage of line media from a lined plug valve for such prolonged periods of time as to enable the line to be shut down before the line media can leak externally or internally of the valve. Suitable pressure-responsive and indicating means are associated with the source of buffering media for continuously indicating the pressure of the buffering media in the valve. If the pressure indicator should indicate a loss of pressure in the buffering media, such loss of pressure is an indication of the fact that the buffering media is leaking externally or internally of the valve, rather than the media being controlled by the valve, and such information will alert an operator to the fact that the valve requires attention.

The subject invention is particularly well adapted for use with valves which control toxic fluids or gases, since the relationship of the buffering media is such as to provide zero internal and external leakage of the media being controlled by reason of the buffering media which, being at a higher pressure than the line media being controlled, will effectively and positively preclude the leakage of line media.

The subject invention does not require any modification in the structural details of the valve body or in the plug, per se, other than the provision of channels in the raised end faces of the flanges, the provision of an elongate passageway which is drilled in the valve body for interconnecting the flange-circumscribing passageways to one or the other of the buffering media-receptive chambers at opposite ends of the plug, and a passageway lengthwise through the plug.

BRIEF DESCRIPTION OF THE DRAWINGS

FIG. 1 is a side view of a plug valve having flanged ends, partly in section which embodies the present invention.

FIG. 2 is a sectional view taken on line 2—2 of FIG. 1.

FIG. 3 is a view similar to FIG. 2 showing a modification thereof.

FIG. 4 is a side view, partly in section illustrating the channelway for buffering media in the flanged ends of the valve body of FIG. 1.

FIG. 5 is a side view similar to FIG. 1, of a plug valve having threaded rather than flanged ends.

FIG. 6 is a view taken on line 6—6 of FIG. 5.

DESCRIPTION OF THE PREFERRED EMBODIMENTS

The numeral 10 denotes generally a body member formed from a suitable metal and having a chamber in the form of a bore 12 which accommodates a correspondingly shaped seal, such as, by way of example, a stationary liner or sleeve 14 formed from a suitable plastic material such as Teflon, a polytetrafluoroethylene, or an equivalent impermeable plastic characterized by its low coefficient of friction and its resistance to corrosive substances, whether liquid or gaseous. A rotatable valving member in the form of a plug 16 is received within liner 14 and includes an outer peripheral surface 18 which corresponds to the inner peripheral surface 15 of liner 14, effecting a fluid-tight relationship therewith.

The lower end of bore 12 is closed by the end or bottom wall 20 of the body member and defines a recess or lower chamber 30 bounded by wall 20, bore 12, the lower face 17 of plug 18, and the lower end 13 of liner 14.

The plug has a through port or opening 40 defining a flow passageway which is adapted to be placed in and out of registry with the inlet and outlet ports 42 and 44, respectively, of the body member and liner incident to rotation of the plug, as is common with plug valves. Liner 14 is fixed against axial end rotational movement within bore 12 by any suitable manner, such as, by way of example, is disclosed in U.S. Pat. No. 3,061,269, to Sinkler.

In the preferred embodiment of the invention, the liner 14 presents to the plug surface a substantially wear-and-corrosive resistant, inherently slippery surface 15 which provides a fluid-tight seal with the smooth peripheral surface 18 of the plug.

The upper open end of bore 12 is closed by a cover member 50 mounted to the body member by means of bolts 52 which engage studs 54 and defines means for mounting the valve member 16 for rotational communication relative to the body member. The cover member includes a central bore 56 in coaxial relationship with the axis of rotation of plug 16, said cover member being provided with several internally threaded openings to accommodate adjusting screws 58 arranged parallel to and equi-distant from the plug axis. Central bore 56 of the cover member loosely accommodates the rotatable actuating stem 60 of valving member 16.

The valving member is maintained against outward axial movement and in abutting, sliding, sealing relationship with liner 14 by the force of adjusting screws 58 bearing against pressure ring 62 which overlies a gas and fluid impervious diaphragm 64 that separates bore 12 from cover chamber 66.

The diaphragm is suitably clamped between cover member 50 and body member 10 at its outer peripheral margin as at 68. In the preferred embodiment of the invention a metallic diaphragm-reinforcing disc 70 is interposed between the diaphragm 64, the pressure ring 62 and cover plate 50 to more effectively distribute the force applied by the pressure ring and screws 58.

The upper end of the valving member includes a raised, central annular seat 80 which is maintained in abutting relationship with the undersurface 82 of the diaphragm by the force of screws 58. Those portions of the upper end of the valving member which are disposed outwardly of the outer periphery of the raised, central annular seat 80 are relieved as at 84 to provide an upper chamber 87 which is bounded by the upper end 85 of the sealing member 14, bore 12, the upper face 84 of the valving member, annular seat 80 and the lower surface of diaphragm 64.

The lower end-face 17 of the valving member 16 presents a surface area to lower chamber 30 which is of a substantially larger area than the area presented by upper annular face 84 to upper chamber 87. Since the contents of the buffering media of chambers 30 and 87 are in equilibrium by reason of passageway 90 which passes through plug 16, as illustrated, the total force which can be applied to the lower end 17 of the plug exceeds the total force which will be applied to the upper, lesser area of annular face 84 of the plug, resulting in the application of a positive, continuous upward thrust against the end face 17, urging upper seat 80 into contacting leak-proof engagement with the fixed bearing surface provided by the under surface of diaphragm 64.

It should be noted that the structural details of the body, valving member, sealing member, cover plate, diaphragm, etc., are similar to corresponding items of my U.S. Pat. No. 3,930,635 since the inventive concept of the present invention is directed to certain modifications of the valve per se of said patent, as will now be developed.

A buffering media, such as, by way of example, a buffering gas in the form of nitrogen or other gas compatible with the gaseous line media being controlled by the valve; or a buffering fluid such as water, alcohol, hydraulic oil, or the like which is compatible with the fluid line media being controlled by the valve is introduced and thereafter maintained under pressure which exceeds the pressure of the line media which is controlled by the valve, at all the potential leak paths of the line media, viz, from the upper portion of the valving member, around the valving member, and, in the case of flange-end valve bodies, from the space between the adjacent surfaces of the flange and the pipe flange which is bolted, or otherwise secured thereto.

In the preferred embodiment of the invention, a buffering media is introduced into chambers 30 and 87, via supply pipe 100 which, as best illustrated in FIGS. 1 and 2 terminates in an annular gas-receptive channel 102 which circumscribes the outer surface 104 of raised face 110 of flange 106 intermediate port 42 and the outer edge 108 of the flange.

Buffering media from channel 102 enters the transverse bore 112 which, as illustrated in FIG. 1, spans, and is in open communication with another, similar annular gas-receptive channel 102' in the outer surface 104' of raised face 110' of flange 106'. Transverse bore 112 is also in open communication with upper chamber 87 which in turn is in open communication with lower chamber 30 via longitudinal passageway 90 of the valving member 16, whereby channels 102, 102', bore 112, passageway 90 and the upper and lower chambers 87 and 30 are subjected to the same pressure of buffering media.

Buffering media is likewise automatically introduced into the interior of the valving member port 40 each time the valve is closed, via a supply pipe 120, the discharge end of which terminates in an opening in the valve body which provides access for the buffering media to enter into that portion of the plug receptive bore which is in open communication with said port 40.

In those instances in which a liner 14 is interposed between the adjacent surfaces of the valving member and body bore an opening 122 is provided through said liner, at a location such that buffering media cannot pass through said opening into port 40 of the valving member until after edge 124 of port 40 has engaged end 126 of the intake port 42 of the liner, incident to the clockwise rotation of the valving member between open and the fully closed position of FIG. 1. It will be understood that the interior of port 40 is in open communication with buffering media at a pressure greater than the media pressure in port 42 whenever the valve is closed.

In those instances in which it becomes necessary or desirable to purge port 40 of the valving member of line media just prior to closing, the relationship of the discharge port of pipe 120 is advanced toward end 126 of port 42 as illustrated in FIG. 3, so that edge 130 of plug port 40 will uncover the discharge port 122, just before edge 124 of plug port 40 engages edge 126 of port 42, thereby permitting the inert buffering media under pressure to enter and purge the contents of port 40 into the line media in both the inlet and outlet ports 42 and 44 of the valve body. As soon as edge 124 of plug port 40 engages edge 126 of port 42, the purging action will cease and plug port 40 will remain pressurized until the valving member is again rotated to an open position. During those periods of time that the valving member is in an open position, portions of surface 132 of the valving member will sealingly engage and thereby block the outer surface of opening 122 for precluding the passage of buffering media therethrough.

In those instances in which the valve body is provided with screw or welded end, rather than flanged ends, pipe 100 and transverse bore 112 are eliminated, and replaced by a pipe (not illustrated) which will introduce buffering media through bottom wall 20 or the valve body into the lower chamber 30, thence to the upper chamber 87 via passageway 90 through the valving member 16.

It should be understood that when the flange-ended valve of FIGS. 1 and 2 is put in a pipe line, a suitable gasket 101, see FIG. 4, is interposed between raised faces 110 and 110' and the complementary surface of an adjacent flange 130, thereby completing a closed chamber as defined by channelways 102 and 102' in the ends of the valve flanges.

By introducing an inert buffering media at pressures greater than the pressure of the line media, any leakage will occur in the buffering media, rather than in the line media being controlled by the valve.

With reference now to FIG. 1, the numeral 200 denotes generally a pressure reservoir for the inert buffering media. Any leakage of such media will be indicated by a change in the reading of the pressure guage 202.

Reservoir 200 may be self-contained, or it may be placed in communication with a source of buffering media, under pressure, via a valve 204, as illustrated. As a practical matter a pressure regulator 206 is interposed within conduit Q for accurately controlling the pressure of the buffering media as introduced into the interior of the valve.

In those instances in which the valve body is provided with welded or threadd ends rather than flanged ends, the construction illustrated in FIGS. 5 and 6 may be utilized. The buffering media from line Q is introduced via pipe 140 to a coupling 142 which threadably engages an internally threaded opening 144 in the bottom wall 20 of the valve body, whereby the buffering media under pressure will be introduced directly into lower chamber 30, thence via plug passageway 90, into upper chamber 87, whereby the buffering media is disposed relative to the valve member, directly, rather than through the circuitous route as illustrated in FIGS. 1 and 2. The buffering media may be introduced into port 40 of the valving member 16 via pipe 140 only after the valve has been closed, or the buffering media may be introduced as illustrated in FIG. 3 for affecting a purging of the plug port 40 of the valving member as the valve is being closed.

In those instances in which a liquid buffering media is used, it may be pressurized by means of a head of compressed gaseous media, such as air, or the like, as illustrated in FIG. 2; or the fluid may be pressurized by means of a pump, or the like, not illustrated. The particular means by which pressure is applied to the gaseous or liquid buffering media is not critical to my inventive concept, so long as suitable means are provided for providing a dependable, continuous supply of buffering media at a pressure greater than the pressure of the gaseous or liquid line media.

It should be understood that the reservoir 200 for the pressurized buffering media may be adjacent the valve body, as in FIGS. 5 and 6, where the reservoir is attached to the valve body via bolts, or the like, 260, which secure the reservoir mounting bracket 262 directly to the valve body.

With particular reference now to FIGS. 1 and 2, I have illustrated two different or alternate types of reservoirs for pressurized buffering media solely for the purpose of indicating that the inventive concept is not limited to any particular source of buffering media. In FIG. 1 any suitable buffering gas may be stored in the reservoir 200 under pressure greater than the line pressure of a gaseous line media. In FIG. 2, I have illustrated one manner in which a suitable liquid buffering media 199 may be stored and made available, under pressure greater than the line pressure of a liquid line media, such as, by way of example, a head of compressed air or other gaseous media 198, within the upper end of the reservoir. It should be understood that the present invention is not limited to the particular means by which the gaseous or liquid buffering media is made available at a continuous pressure which is greater than the line media being controlled by the valve.

In FIG. 4, flange 106 of the valve body is securely, though releasably, fastened to pipe flange 130 by means of bolts 131 which extend through axially aligned bolt holes in each of said flanges, as is customary in the art.

If desired, buffering media under pressure in excess of the pressure of line media may be supplied to a plurality of valves from a common source f pressurized buffering media.

In those instances in which a liner, such as 14, is not utilized, such as, by way of example, in conventional metal-to-metal plug valves, or in lubricated plug valves, the boreadjacent end of the opening in the valve body which is in open communication with supply pipe 120 is adapted to be engaged by the outer surface of the valving member for controling the introduction of pressurized buffering media into port 40 as in FIGS. 2 and 3.

It should be understood that when the subject invention is applied to metal-to-metal valves, or to lubricated plug valves, they will be provided with a lower chamber 30, and upper chamber 87 and the valving member or plug will be provided with an elongate passageway 90.

From the foregoing it will be noted that I have thus provided simple, yet highly effective, means for positively preventing the external and/or internal leakage of line media from a lined plug valve.

What is claimed is:

1. The improvement which confines any leakage to externally applied pressurized buffering media rather than line media in a rotary plug valve of the type which includes a body portion having inlet and outlet ports, a plug rotatably mounted in the body and having a through-port defined therein for fluidly connecting the inlet and outlet ports to permit flow of line media through the valve, means for rotating the plug to selectively fluidly connect and isolate the inlet and outlet ports, upper and lower chambers defined in the body portion adjacent opposite ends of the plug, and means fluidly connecting the upper and lower chambers for establishing a condition of fluid equilibrium therein, the improvement comprising:

means for introducing pressurized buffering media to said chambers;

means for introducing pressurized buffering media into the through-port of the plug when the inlet and outlet ports of the valve body are fluidly isolated from each other by said plug so that when said inlet and outlet ports are in fluid communication via the through-port of the plug the pressurized buffering media in said through-port is exhausted into the line media; and means for connecting each of the aforesaid means to an external source of buffering media at a pressure above the pressure of the line media.

2. A valve as called for in claim 1 wherein the means for introducing buffering media into the through port of the plug places the through port of the plug in open communication with buffering media while the through port of the plug is in open communication with the line media just prior to closure of said through port, whereby the initial introduction of buffering media into said through port will purge said through port of line media.

3. A valve as called for in claim 1, wherein the improvement further includes flanged ends on the valve body each of which includes a raised sealing face; a groove defined in the raised sealing face of said flanged ends; and means for interconnecting each groove in open communication with pressurized buffering media.

4. A valve as called for in claim 1, wherein the buffering media is housed within a pressure chamber which is secured to and carried by the valve, said chamber including means continuously indicating the pressure of the buffering media.

5. A valve as called for in claim 1, wherein the means for introducing buffering media into the through port supplies buffering media to the through port of the plug before it is in a closed position, whereby the buffering media will purge said through port of line media just prior to closing of the valve and fill said through port with buffering media.

6. A valve as called for in claim 1, wherein the buffering media comprises a fluid which is compatible with fluid line media.

7. A valve as called for in claim 1, wherein the buffering media comprises an inert gas which is compatible with gaseous line media.

8. The valve as called for in claim 1, wherein the improvement further comprises a body member having an open upper portion and a closed lower portion and having the plug rotatably mounted thereon, a sealing member, flow passages defined in said body, said plug valve and said sealing member, means mounting the plug for rotational movement relative to the body and sealing members to place the flow passage of the plug valve in and out of communication with the flow passages of said body and sealing members; said sealing member interposed between the peripheral face of the plug and body member; a first chamber defined by the lower end of the sealing member, the lower end of the plug and the lower portion of said body member; the upper end of said plug terminating in a centrally disposed, outwardly projecting actuator stem; an annular seat circumscribing the upper end of said plug adjacent said actuator stem; a flexible, fluid-impervious diaphragm having a central opening therein accommodating the actuator stem, said diaphragm spanning the upper end of the plug and terminating in an outer marginal portion which overlies the upper portion of the body member; means securing the marginal portion of the diaphragm relative to the body member; means positioning those portions of the diaphragm between its outer marginal edge and the actuator stem of the plug against outward axial movement relative to said plug; an annular recess circumscribing the peripheral-adjacent portion of the upper end of the plug; a second chamber defined by the upper end of the sealing member, the annular recess circumscribing the upper end of the plug, the upper portion of the body member and the undersurface of the diaphragm; a passageway establishing continuous open communication between said first and second chambers; a source of buffering media under pressure; means connecting said source of buffering media to each of said chambers and the passageway therebetween; wherein the buffering media in the first-mentioned chamber presses against the lower end of the plug for urging it toward the diaphragm for disposing the annular seat which circumscribes the upper end of the plug in contacting, leak-proof engagement with said diaphragm; wherein the buffering media in the second chamber presses against the diaphragm intermediate to said annular seat and the locus of securement of the marginal portion of the diaphragm to the body member, to resist flow of line media past said annular seat and along the actuator stem of the plug; said means introducing buffering media to the plug through port doing so when said member is in a closed position; whereby said buffering media is disposed in blocking relationship with respect to the internal and external leakage paths of the line media.

9. A valve as called for in claim 8, wherein the source of pressurized buffering media comprises a reservoir which is secured to and carried by the body member, and wherein means are provided for continuously indicating the pressure of the buffering media within the valve.

10. A valve as called for in claim 8, wherein the flow passages of the body member terminate in flanged ends each having a raised sealing face; a continuous groove in and circumscribing each sealing face; a passageway in the body member interconnecting each groove with the second mentioned chamber; and wherein the source of buffering media is connected to one of said grooves, whereby said buffering media is supplied via said last mentioned passageway from said one groove to said second chamber, thence to the first mentioned chamber via the passageway in the plug, and to the other of said flange grooves.

11. An improvement in a method of precluding both external and internal leakage of line media from a plug valve of the type which includes a valve body having inlet and outlet ports and a plug with a through-port defined therein for selectively fluidly connecting and isolating the inlet and outlet ports, a lower chamber in open communication with the lower end of the plug member, an upper chamber in open communication with the upper end of the plug and means fluidly interconnecting the upper and lower chambers, the improvement comprising:

pressurizing a buffering media to a pressure greater than the pressure of the line media;

continuously applying the pressurized buffering media to the valve at all of the potential leak paths of line media from which leakage of line media could occur but for the presence of the pressurized buffering media, whereby any leakage will be buffering media rather than line media by:

introducing and continuously maintaining the pressurized buffering media in the said chambers thereby buffering them;

introducing and continuously maintaining the pressurized buffering media in the through-port of the plug when the inlet and outlet ports of the valve body are fluidly isolated from each other by the plug thereby buffering the through-port of the plug; and exhausting the pressurized buffering media in the through-port of the plug into the line media when the inlet and outlet ports of the valve body are in fluid communication via the through-port of the plug.

12. A method as called for in claim 1, wherein the pressurized buffering media is an inert gas which is compatible with the line media.

13. A method as called for in claim 11, wherein the pressurized buffering media is a liquid which is compatible with the line media.

14. A method as called for in claim 11, wherein the improvement further includes the step of placing the plug through port in communication with pressurized buffering media just prior to closing the valve, whereby the introduction of buffering media into the plug through port will purge it of line media, and wherein said through port will be filled with said buffering media when the valve is closed.

15. A method as called for in claim 11, wherein the improvement further includes the additional steps of:
providing the valve with mounting flanges, each having a raised face;
providing a channelway in the raised face of the mounting flanges;
closing said channelways by securing mounting flanges of a line-media pipe thereto; and
introducing and maintaining pressurized buffering media in said closed channelways.

16. A method as called for in claim 11, which comprises the additional step of placing the channelways in the raised face of said mounting flanges in open communication with the chambers at the ends of the plug.

17. A method as called for in claim 11, wherein the improvement further comprises the additional step of continuously indicating the pressure of the buffering media.

* * * * *